Feb. 2, 1932.    D. HAVILAND    1,843,322
PREPARATION OF ARTIFICIAL SKINS WITH NATURAL HAIR
Filed Oct. 23, 1930
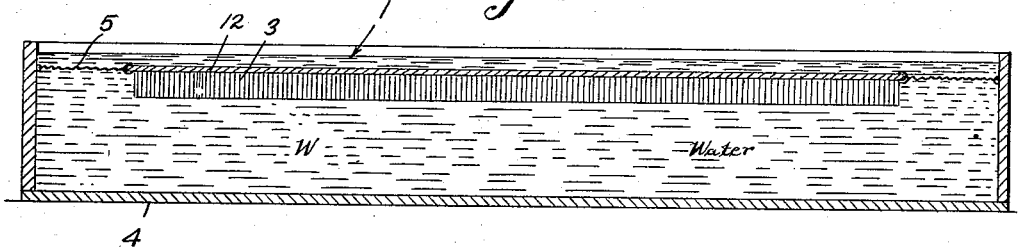
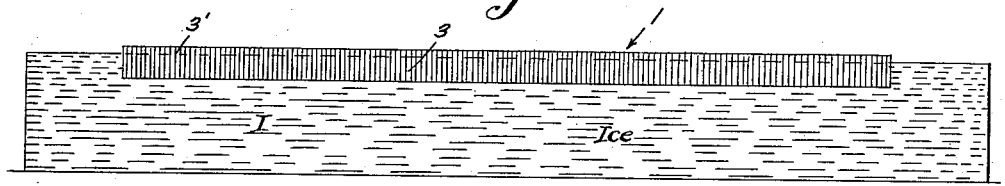
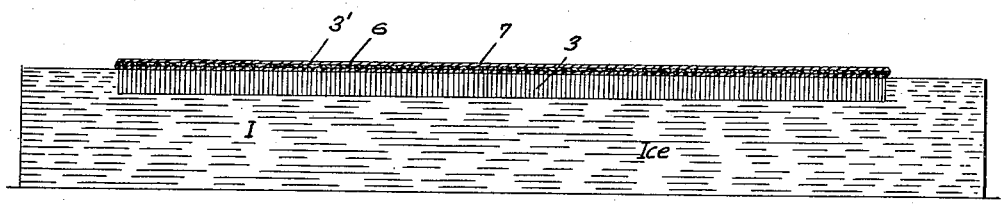
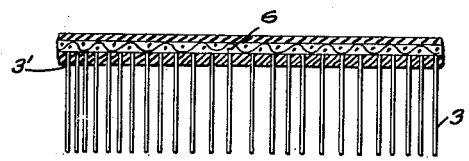
Inventor
Daniel Haviland.
by Hazard and Miller
Attorneys Patented Feb. 2, 1932

1,843,322

UNITED STATES PATENT OFFICE

DANIEL HAVILAND, OF SAWTELLE, CALIFORNIA

PREPARATION OF ARTIFICIAL SKINS WITH NATURAL HAIR

Application filed October 23, 1930. Serial No. 490,721.

My invention relates to the preparation of artificial skins with natural hair.

Skins with the natural fur thereon are often of little or no value for use in the making of fur pieces or clothing for the reason that while the natural hair may be in good condition the skin itself is either so fragile or defective by reason of age or other causes, that their use would be uneconomic because the skin would soon become torn or disintegrated.

It is an object of this invention to provide a method whereby the old or defective skin may be removed in a simple and efficient manner and a substitute skin may be firmly attached to the roots of the fur. The substitute skin may be vulcanized to the roots of the fur and also rendered water proof, making it especially adapted for the lining of coats and the like.

In particular, my invention contemplates freezing the skin with the fur in a block of ice, removing the skin from the fur, preparing the roots of the fur to attach a substitute skin, removing the ice, and permanently attaching the substitute skin to the fur.

With the above and other objects in view which will appear as the description proceeds, my invention consists in the steps of the method hereinafter described and claimed.

In the accompanying drawings which form a part of this specification I have illustrated diagrammatically the successive steps of the method, and in which:

Fig. 1 is a longitudinal, vertical section showing the fur skin frozen solid in a block of ice;

Fig. 2 is a similar section showing the skin removed with the fur embedded in the ice and the layer of ice adjacent the roots of the fur removed therefrom;

Figure 3 shows the next step of temporarily attaching a substitute skin to the fur while the latter is still embedded in the ice;

Fig. 4 shows the substitute skin attached to the fur, the ice having been removed; and Fig. 5 shows an enlarged, vertical, detail section showing the completed operation with the substitute skin permanently vulcanized to the fur.

To facilitate the description the term fur skin will be used to designate the natural skin with the fur thereon and the term skin for the skin proper without the fur.

The fur skin 1 consisting of the skin 2 and the fur portion 3 is preferably subjected to a shrinking process so as to decrease the area of the skin and thus compact the fur 3. The fur skin 1 is placed into a suitable container 4 containing water W and is agitated and kneaded so as to expel any air occluded in the fur 3. The water is preferably heated to remove any dissolved air and the fur skin 1 is disposed horizontally therein by a suitable fastening 5 or a wooden screen or the like. The body of water with the fur skin therein is now subjected to a freezing operation, turning the same into a solid block of ice with the fur skin 1 embedded therein. The block of ice is preferably taken from the container 4 and the skin 2 is shaved off or removed by a suitable means from the fur 3. The topmost layer of ice is melted or otherwise removed so as to expose the roots 3' of the hair for a small distance and the same are treated with a suitable solution to cause an adhesion between them and the substitute skin to be applied. If a rubberized fabric is to be used as a substitute skin a dilute solution of rubber in a suitable volatile solvent is brushed over the roots 3' of the fur and then a substitute skin such as a rubberized fabric 6 is pressed down upon them so that the fabric 6 and the fur will adhere. The ice is now melted and the new skin 6 with its fur 3, preferably after a drying operation, is now vulcanized so as to cause a firm bonding between the fur and the rubberized fabric.

If the new fur skin is to be used as a lining for fur coats and the like the rubberized fabric 6 may be provided with an outer water proof layer 7, preferably made of rubber.

My method contemplates the use of a large number of small pieces of fur skins which may be matched and assembled and temporarily fastened as by stitching or the like to a thin fabric so that a new fur skin of any desired size may be made.

In place of a rubberized fabric any other fabric or a suitable sheet such as flexible leather and the like may be used, and any other attaching means in place of the rubber solution may be employed. It may not always be necessary to expose the roots of the fur for a slight distance and give them a preliminary treatment for attachment to the substitute skin but the preliminary treatment of the roots of the fur by removing the layer of ice adjacent thereto is preferred.

Various changes may be made in the steps of the method by those skilled in the art without departing from the spirit of my invention as claimed.

I claim:

1. A method of preparing an artificial skin for fur skins comprising shrinking the fur skin to compact the fur thereon, immersing the same in water and removing occluded air from the fur and dissolved air from the water, arranging the fur skin in a horizontal position, freezing the water that the fur skin will be embedded in the ice formed, cutting away the skin while leaving the fur embedded in the ice, exposing the roots of the fur for a slight distance by removing the ice therefrom, applying a rubber solution thereto, attaching a rubberized fabric to the roots of the fur, removing the ice from the fur, and vulcanizing the fabric to the fur.

2. A method of preparing an artificial skin for fur skins comprising immersing the fur skin in water and removing and expelling the air from the fur and from the water, freezing the water to embed the fur skin in a solid block of ice, removing the skin while leaving the fur embedded in the ice, exposing the roots of the fur for a slight distance and applying a rubber solution thereto, attaching a rubberized fabric to the roots of the fur, removing the ice from the fur and vulcanizing the fabric to the fur.

In testimony whereof I have signed my name to this specification.

DANIEL HAVILAND.